(12) United States Patent
Krumbein

(10) Patent No.: US 10,589,194 B2
(45) Date of Patent: Mar. 17, 2020

(54) FILTRATION MODULE AND METHOD FOR PRODUCING SAME

(71) Applicant: Sartorius Stedim Biotech GmbH, Goettingen (DE)

(72) Inventor: Thomas Krumbein, Ebergoetzen (DE)

(73) Assignee: Sumitomo Wiring Systems, Ltd. (DE)

( * ) Notice: Subject to any disclaimer, the term of this patent is extended or adjusted under 35 U.S.C. 154(b) by 469 days.

(21) Appl. No.: 15/505,453

(22) PCT Filed: Sep. 17, 2015

(86) PCT No.: PCT/EP2015/071297
§ 371 (c)(1),
(2) Date: Feb. 21, 2017

(87) PCT Pub. No.: WO2016/042062
PCT Pub. Date: Mar. 24, 2016

(65) Prior Publication Data
US 2017/0266590 A1 Sep. 21, 2017

(30) Foreign Application Priority Data
Sep. 18, 2014 (DE) .................. 10 2014 113 497

(51) Int. Cl.
*B01D 25/26* (2006.01)
*B01D 63/08* (2006.01)
(Continued)

(52) U.S. Cl.
CPC .......... *B01D 25/26* (2013.01); *B01D 25/001* (2013.01); *B01D 61/147* (2013.01); *B01D 63/08* (2013.01);
(Continued)

(58) Field of Classification Search
CPC .............. B01D 2313/02; B01D 63/082; B01D 2311/2626; B01D 29/012; B01D 63/081;
(Continued)

(56) References Cited

U.S. PATENT DOCUMENTS

| 4,039,455 A | 8/1977 | Bardin et al. |
|---|---|---|
| 4,062,778 A | 12/1977 | Riede |
| 4,268,372 A | 5/1981 | Iizima et al. |

(Continued)

FOREIGN PATENT DOCUMENTS

| CN | 102794482 | 11/2012 |
|---|---|---|
| DE | 25 21 977 | 12/1975 |

(Continued)

OTHER PUBLICATIONS

English Translation of Interational Preliminary Report for Application No. PCT/EP2015/071297 dated Mar. 21, 2017.
(Continued)

*Primary Examiner* — Ana M Fortuna
(74) *Attorney, Agent, or Firm* — Gerald E. Hespos; Michael J. Porco; Matthew T. Hespos

(57) ABSTRACT

A filtration module (1) has a filter unit (2) with at least one filter element (6) arranged between first and second plates (4, 5). The filter element (6) has at least one layer of filter material (9, 10) sealed off at a periphery by an edge seal (12). The plates (4, 5) are pressed against each other by a resilient bracketing profile (3) that engages around the plates (4, 5) at their opposite side surfaces (21, 22, 23, 24). The bracketing profile (3) has a base (13) that curves inward transversely to the longitudinal direction (14) of the plates (4, 5) and that is delimited by lateral brackets (16, 17) that are bent inward at their free ends (18, 19) to engage laterally around a surface (20) of the filter element (6) facing away from the base (13). A method also is provided for producing a filtration module.

15 Claims, 4 Drawing Sheets

(51) Int. Cl.
    *B01D 25/00*     (2006.01)
    *B01D 61/14*     (2006.01)
    *B01D 69/02*     (2006.01)
    *F16B 5/06*      (2006.01)

(52) U.S. Cl.
    CPC ......... *B01D 63/082* (2013.01); *B01D 63/084* (2013.01); *B01D 69/02* (2013.01); *F16B 5/0635* (2013.01); *F16B 5/0642* (2013.01); *B01D 63/081* (2013.01); *B01D 2313/02* (2013.01); *B01D 2325/12* (2013.01)

(58) Field of Classification Search
    CPC .............. B01D 63/084; B01D 2313/14; B01D 2201/305; B01D 2201/34; B01D 25/26
    See application file for complete search history.

(56) References Cited

U.S. PATENT DOCUMENTS

| | | | |
|---|---|---|---|
| 5,108,704 A | 4/1992 | Bowers et al. | |
| 5,178,760 A | 1/1993 | Solberg, Jr. | |
| 5,192,434 A * | 3/1993 | Moller | B01D 63/081 210/227 |
| 5,225,080 A * | 7/1993 | Karbachsch | B01D 25/001 210/321.75 |
| 5,618,418 A | 4/1997 | Demmer et al. | |
| 6,165,365 A * | 12/2000 | Salyer | B01D 63/16 210/107 |
| 6,602,325 B1 * | 8/2003 | Frost | B01D 53/22 210/321.75 |
| 6,613,231 B1 * | 9/2003 | Jitariouk | B01D 63/16 210/321.69 |
| 8,470,174 B2 * | 6/2013 | Kiene | B01D 63/082 210/153 |
| 8,535,536 B1 * | 9/2013 | Gale | B01D 57/00 210/198.1 |
| 8,821,726 B2 * | 9/2014 | Matsuzaki | B01D 61/18 210/241 |
| 2005/0161384 A1 * | 7/2005 | Mahendran | B01D 61/18 210/209 |
| 2008/0257813 A1 | 10/2008 | Proulx et al. | |
| 2013/0239812 A1 | 9/2013 | Edlund | |
| 2014/0008290 A1 | 1/2014 | Moriya et al. | |

FOREIGN PATENT DOCUMENTS

| | | |
|---|---|---|
| DE | 26 32 078 | 3/1977 |
| DE | 41 05 074 | 11/1991 |
| DE | 44 32 628 | 3/1996 |
| EP | 0 359 249 | 3/1990 |

OTHER PUBLICATIONS

Chinese Search Report.
International Search Report dated Dec. 11, 2015.

* cited by examiner

FILTRATION MODULE AND METHOD FOR PRODUCING SAME

BACKGROUND

1. Field of the Invention

The invention relates to a filtration module with a filter unit in which at least one filter element is arranged between a first plate and a second plate, the filter element containing at least one layer of filter material, wherein the layers arranged between the plates are sealed along the periphery by an edge seal and wherein the plates are pressed against one another by pressing means. The invention further relates to a method for producing a filtration module.

2. Description of the Related Art

DE 44 32 628 A1 discloses a filtration module and a method for its production. The filtration module has a filter unit in which, between a first plate and a second plate, there are membrane adsorbers arranged between layers of woven material. The layers each have an edge seal along their periphery.

With regard to the known device, which has generally proved its worth, it is disadvantageous that the two plates are pressed against one another by a plurality of a type of laterally positionable clamp serving as the pressing means. This is relatively labor-intensive and can result in uneven contact pressure distribution at the periphery.

US 2008/0257813 A1 discloses a filtration module and a method for its production in which the filtration module has two plates that have snap-fit connectors on the contact surfaces that face one another, wherein the first plate has prongs capable of engaging in corresponding sockets on the second plate.

In this regard, it is disadvantageous that it is relatively difficult to bring about a secure engagement, on the one hand and to achieve the necessary pressing force, on the other. Moreover, multiple snap-fit connectors are required to achieve an even contact pressure.

The present invention seeks to improve the known devices and methods so that they can be designed more simply, with fewer parts, and can be produced more cost-effectively and quickly, without sacrificing reliability.

SUMMARY

The task with regard to the device is solved in conjunction with a filtration module having a filter unit in which at least one filter element is arranged between first and second plates. The at least one filter element has at least one layer of filter material. The layers arranged between the plates are each sealed off at the periphery by an edge seal, and the plates are pressed against each other by pressing means. The pressing means is designed as a resilient bracketing profile that clasps the plates at their mutually opposing side surfaces. The bracketing profile has a base that is curved inwards transversely to the longitudinal direction of the plates and is delimited in the longitudinal direction by lateral brackets that are curved inwards at their free ends and which, with their curved ends, engage laterally around the surface, facing away from the base, of the first plate that faces away from the base.

By designing the pressing means as a resilient bracketing profile, the contact pressure can be predetermined and ensured via the geometry and elasticity of the material. The fact that the plates are clasped along their entire length at their mutually opposing side surfaces additionally results in uniform contact force distribution and a reliable connection using only one pressing means. The curved arrangement of the base of the bracketing profile and the laterally arranged brackets, whose free ends are curved inwards and are supported on the surface of the first plate, results in a pre-tensioning effect, which continuously maintains the necessary contact pressure. The device has fewer parts and can be manufactured more quickly, easily and cost-effectively.

In one embodiment, the filter element additionally contains an inflow material as a first layer and an outflow material as a last layer. The inflow or outflow material can be, in particular, a woven, nonwoven, or knitted material, a mesh, lattice, perforated plate or similar.

According to another embodiment, the filter element has a common peripheral edge seal with the layers arranged between its plates. This significantly simplifies assembly.

The at least one layer of filter material may be a surface or depth filter with adsorption or microfiltration properties. Membranes can be used as a surface filter and a fiber material can be used as a depth filter, for example. Furthermore, filter materials with adsorber properties and in principle also ultrafilters can be used.

The surfaces of the plates facing the filter element may have flow paths. The flow paths can in particular fulfil the function of inflow and/or outflow material or inflow and/or outflow fabrics.

The lateral brackets may be curved outwards transversely to the longitudinal direction of the plates.

The curvature of the lateral brackets serves to produce a certain amount of elongation when the plates are clasped or gripped, and this creates additional pre-tensioning to increase the contact pressure.

The curved free ends of the brackets may be bent backwards, at their end faces pressing against the surface, facing away from the base, of the first plate facing away from the base.

Due to the backwards-bent free ends of the brackets and the force applied orthogonally relative to the plates, the end faces of the free ends of the brackets in each case ensure a defined line along which force is applied.

The second plate facing toward the base of the bracketing profile may have, on its underside facing toward the base, transversely to the longitudinal direction, an inward curvature oriented toward the upper side facing away from the underside. The radius of the curvature may be larger than the curvature radius of the base of the bracketing profile. As a result, the two curvatures can have the same vertex.

According to another embodiment, the first plate facing away from the base of the bracketing profile has, on its surface facing away from the base, in each case raised latching ridges that extend parallel to the side surfaces running in the longitudinal direction. Each of the latching ridges may be engaged from behind by the free ends of the lateral brackets.

The latching ridges engage with the free ends of the lateral brackets, and reliably prevent unintentional unlatching.

The latching ridges may have concave outer side surfaces that slant laterally downward to the side surfaces.

The downward-slanting outer side surfaces facilitate latching during assembly.

According to another embodiment, the first plate is designed as an inflow plate and the second plate as an outflow plate. The filter unit may be designed for crossflow or dead-end filtration. The filter unit and/or the bracketing profile are preferably made of plastic.

The invention also relates to a method for producing the above-described filtration module that includes the following steps:

a) Placing the layers to be arranged between the plates, which layers are sealed by a common edge seal along the periphery, onto the surface of the second plate, which surface faces toward the first plate,
b) Placing the first plate, with its underside facing toward the second plate, onto the surface, facing toward the first plate, of the common edge seal of the layers and
c) Pressing the filter unit into the resilient bracketing profile until the plates are engaged at their mutually opposed side surfaces.

The design of the device according to the invention also significantly simplifies the method for its manufacture, so that the device can be produced more easily, rapidly, cost-effectively, yet nevertheless reliably—in fewer steps, using fewer parts Further features and advantages of the invention result from the following specific description and the drawings.

DETAILED DESCRIPTION

Figure 1:
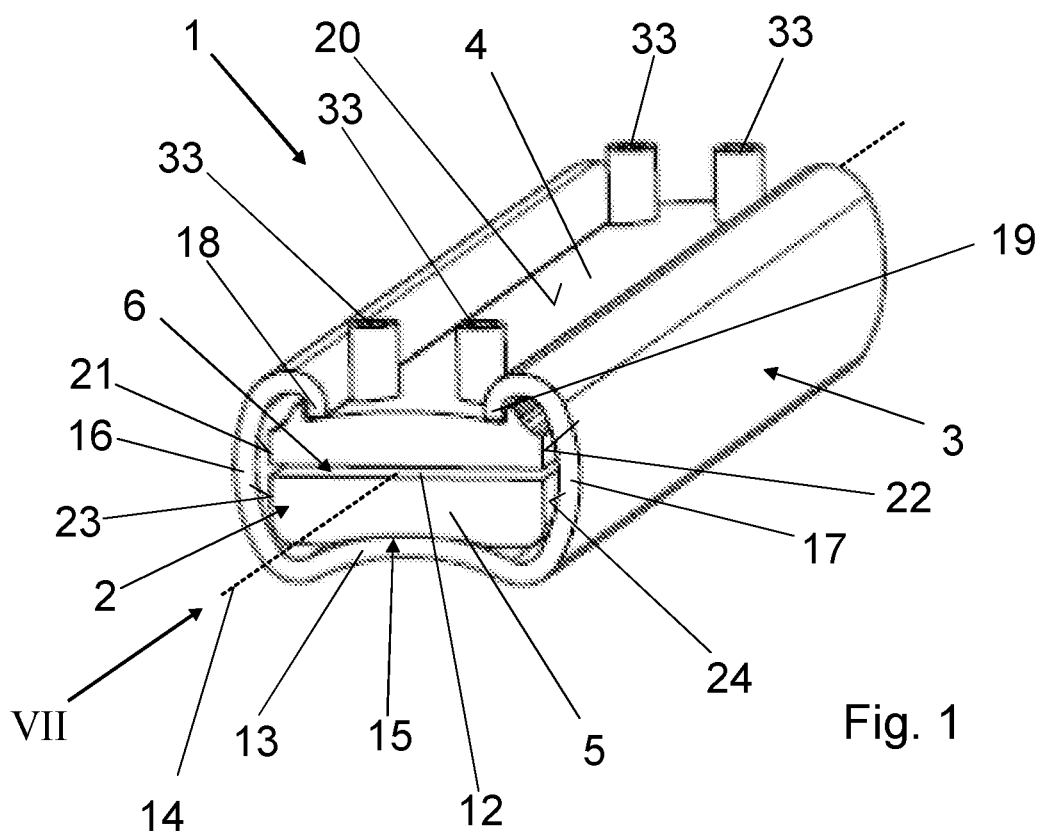
FIG. 1 shows a three-dimensional view of a filtration module in a final latched position.

A filtration module 1 essentially consists of a filter unit 2 and a bracketing profile 3. The filter unit 2 has a first plate 4 and a second plate 5. A filter element 6 is arranged between the two plates 4, 5. The filter element 6 is designed as a multi-layer filter module that has a first layer of filter material 9 between a layer of woven inflow material 7 and a layer of woven outflow material 8. In the exemplary embodiments, a second layer of filter material 10 is arranged between the layer of woven outflow material 8 and another layer of woven inflow material 7. The layers of the filter material 9, 10 each have a sealing frame 11 oriented toward the layer of woven outflow material 8 arranged between them. The layers 7, 8, 9, 10 that form the filter element 6 have a common peripheral edge seal 12. The edge seal 12 is made of an elastomer that is cast on externally.

The bracketing profile 3 has a base 13 that is inwardly curved transversely to the longitudinal direction 14 of the plates 4, 5 with a curvature radius 15 and in the longitudinal direction 14, it is delimited by lateral brackets 16, 17, which are curved inwards at their free ends 18, 19 and which, with their bent ends 18, 19 laterally engage the surface 20, facing away from the base 13, of the first plate 4 facing away from the base 13. The bent free ends 18, 19 of the brackets 16, 17 are bent backwards while their end faces are pressed against the surface 20 of the first plate 4.

The lateral brackets 16, 17 are curved outwards transverse to the longitudinal direction 14 of the plates 4, 5, i.e. oriented away from the side surfaces 21, 22 of the first plate 4 and from the side surfaces 23, 24 of the second plate 5. On its underside 25 facing toward the base 13, the second plate 5 has an inward curvature 27 transverse to the longitudinal direction 14, i.e. a curvature toward its upper side 26 facing away from the underside 25, the radius 28 of said curvature being larger than the curvature radius 15 of the base 13.

Figure 2:
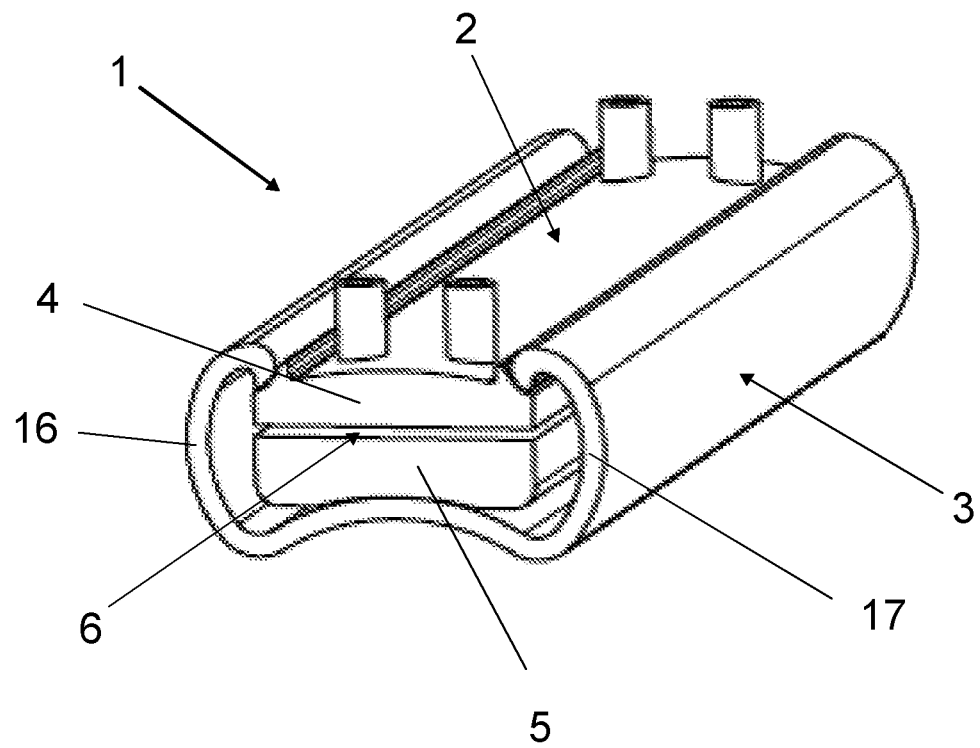
FIG. 2 shows a three-dimensional view of the filtration module from FIG. 1 in a partially latched position.
Figure 3:
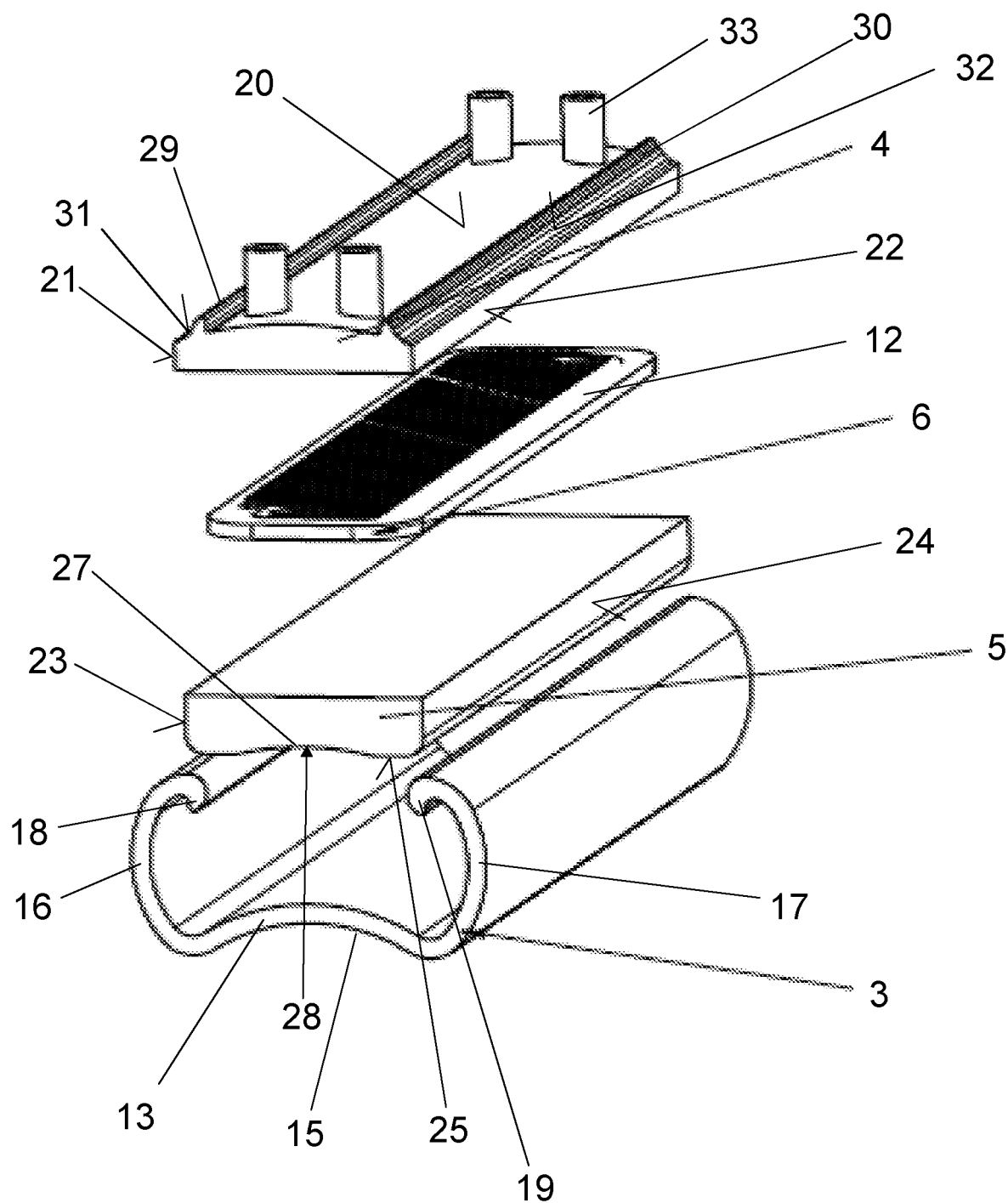
FIG. 3 shows an exploded view of the filtration module from FIG. 1.
Figure 4:
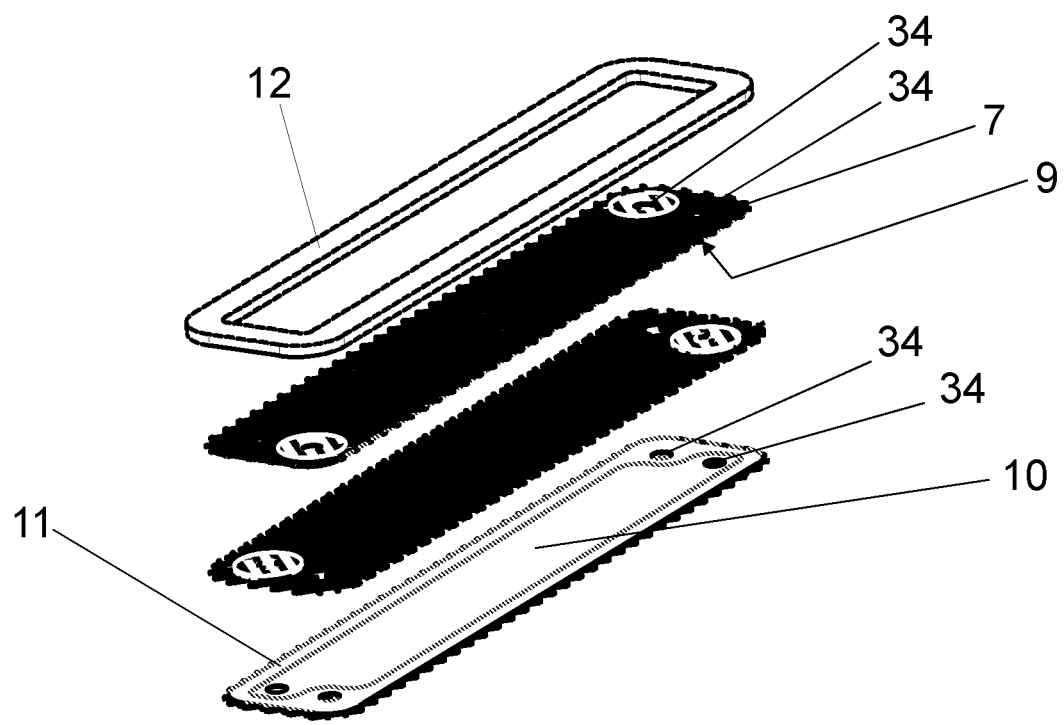
FIG. 4 shows a three-dimensional exploded view of the filter elements from FIG. 1.
Figure 5:
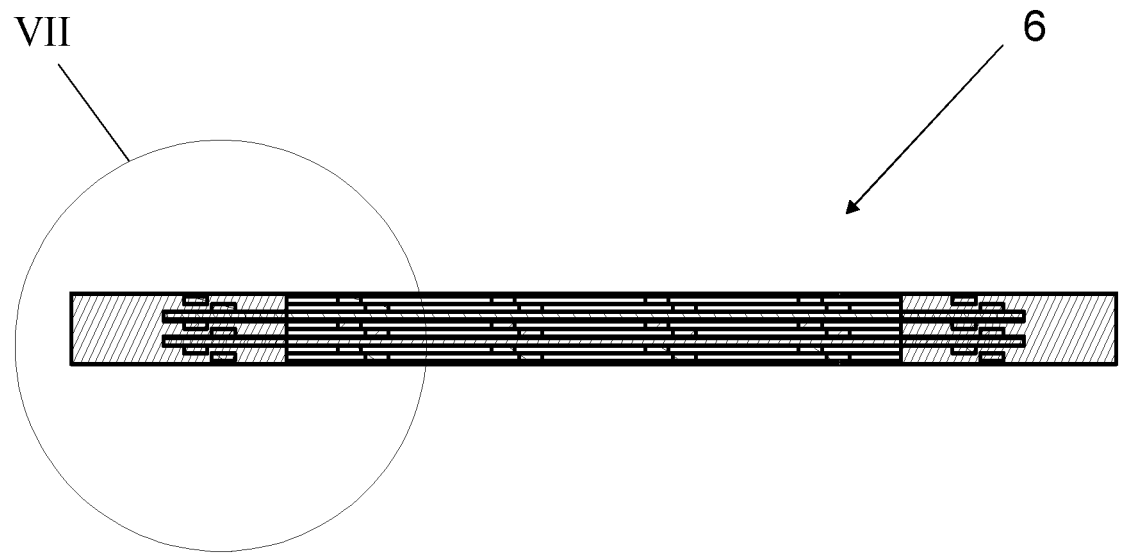
FIG. 5 shows a lateral cross-sectional view of the filter elements from FIG. 1.
Figure 6:
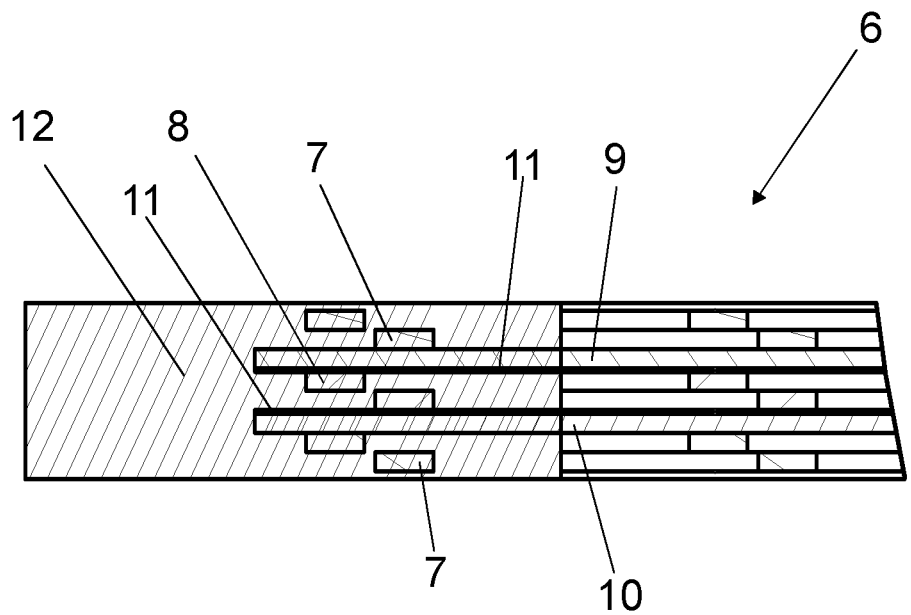
FIG. 6 shows an enlarged detail view of detail VII from FIG. 5.
Figure 7:
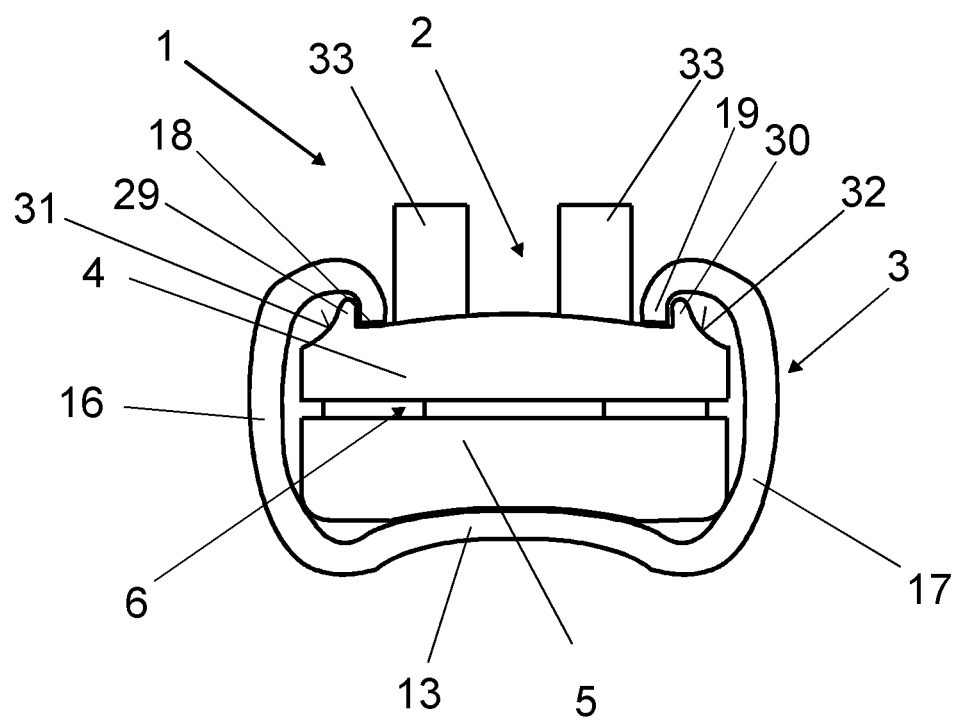
FIG. 7 shows a lateral view of the filtration module from FIG. 1 from Direction VII.

On its surface 20, the first plate 4 has raised latching ridges 29, 30 extending parallel to each of its side surfaces 21, 22 in the longitudinal direction 14. In a fully latched state, the latching ridges 29, 30 are engaged from behind by the free ends 18, 19 of the brackets 16, 17. The latching ridges 29, 30 have concave outer side surfaces 31, 32 slanting laterally downward toward the side surfaces 21, 22. In a partially latched state, the free ends 18, 19 of the lateral brackets 16, 17 are supported on the outer side surfaces 31, 32 (see FIG. 2).

According to the exemplary embodiments, the first plate 4 is designed as an inflow plate and the second plate 5 is designed as an outflow plate. The first plate 4 has the usual connections 33 known from the cross-flow sector for feed, retentate and permeate (in duplicate).

To produce the filtration module 1, the filter element 6 is laid between the first plate 4 and the second plate 5. The openings 34 in the filter element 6 are congruent with the connections 33 of the first plate 4. The filter unit 2 formed in this way is placed into the bracketing profile 3 until the free ends 18, 19 of the brackets 16, 17 rest on the outer side surfaces 31, 32 of the latching ridges 29, 30 in a partially latched position.

Next, the laterally curved brackets 16, 17 are pressed together until the open ends of the bracketing profile 3 engage over the latching ridges 29, 30 and then latch in the final position. As a result of this process, the curved brackets 16, 17 are moved inwards and their free ends 18, 19 are moved upwards. Both motions serve to enlarge the radius of the curvature in the area of the base 13 and of the radii of the curvature in the area of the brackets 16, 17. The resulting tension pulls the first plate 4 against the second plate 5 and compresses the filter element 6 between the plates 4, 5. The compression seals the filter element 6 relative to the plates 4, 5 so that no fluid is able to escape to the exterior and the channels for filtrate and unfiltrate are sealed relative to each other in the interior of the filter unit 2.

Of course, the embodiments discussed in the specific description and shown in the figures are merely illustrative exemplary embodiments of the present invention. In light of this disclosure, a person skilled in the art is given a wide range of possible variations.

LIST OF REFERENCE NUMBERS

1 Filtration module
2 Filter unit
3 Bracketing profile
4 First plate of 2
5 Second plate of 2
6 Filter element of 2
7 Layer of woven inflow material of 6
8 Layer of woven outflow material of 6
9 First layer of filter material of 6
10 Second layer of filter material of 6
11 Sealing frame
12 Edge seal
13 Base of 3
14 Longitudinal direction of 1
15 Curvature radius of 13
16 First bracket of 3
17 Second bracket of 3
18 Free end of 16

19 Free end of 17
20 Surface of 4
21 Side surface of 4
22 Side surface of 4
23 Side surface of 5
24 Side surface of 5
25 Underside of 5
26 Surface of 5
27 Curvature of 5
28 Curvature radius of 27
29 Latching ridge of 20
30 Latching ridge of 20
31 Outer side surface of 29
32 Outer side surface of 30
33 Connection
34 Opening of 6

The invention claimed is:

1. A filtration module, comprising:
a filter unit with:
at least one filter element containing at least one layer of filter material, the at least one filter element having opposite first and second surfaces and an outer periphery extending between the opposite first and second surfaces,
an edge seal sealing the outer periphery of the at least one filter element,
a first plate having an inner surface opposed to the first the first surface of the at least one filter element and an outer surfacing facing away from the at least one filter element, and
a second plate having an inner surface opposed to the second surface of the at least one filter element and an outer surface facing away from the at least one filter element; and
a resilient bracketing profile having a base that curves inward transversely with respect to a longitudinal direction of the first and second plates and that engages the outer surface of the second plate, lateral brackets extending from opposite lateral sides of the base and opposed to lateral sides of the filter unit and having free ends bent toward the base and engaging the outer surface of the first plate.

2. The filtration module of claim 1, wherein
the filter element additionally contains an inflow material as a first layer and an outflow material as a final layer.

3. The filtration module of claim 1, wherein
the at least one layer of filter material comprises plural layers of filter material arranged between the first and second plates, and wherein the edge seal is a common peripheral edge seal sealing all of the peripheral layers.

4. The filtration module of claim 1, wherein
the at least one layer of filter material is a surface filter or a depth filter with adsorption or microfiltration properties.

5. The filtration module of claim 1, wherein
the inner surfaces of the first and second plates have flow paths.

6. The filtration module of claim 1, wherein
the free ends of the lateral brackets of the resilient bracketing profile press against the outer surface of the first plate.

7. The filtration module of claim 1, wherein
the lateral brackets are curved outwards transversely to the longitudinal direction of the first and second plates.

8. The filtration module of claim 1, wherein
the outer surface of the second plate has an inwardly concave curvature transverse to the longitudinal direction and having a curvature radius that is larger than a curvature radius of the base of the resilient bracketing profile.

9. The filtration module of claim 1, wherein
the outer surface of the first plate has raised latching ridges extending in the longitudinal direction and engaged by the free ends of the lateral brackets.

10. The filtration module of claim 9, wherein
the latching ridges have concave outer side surfaces that slant laterally down toward the side surfaces.

11. The filtration module of claim 1
wherein
the first plate is an inflow plate and the second plate is an outflow plate.

12. The filtration module of claim 1, wherein
the filter unit is designed for crossflow or dead-end filtration.

13. The filtration module of claim 1, wherein
the filter unit and/or the bracketing profile is made of plastic.

14. A method for producing the filtration module of claim 1 comprising:
a) placing the at least one filter element and the edge seal onto the inner surface of the first plate,
b) placing the inner surface of the first plate on the edge seal and facing toward the inner surface of second plate to form the filter unit, and
c) pressing the filter unit into the resilient bracketing profile until the first and second plates are engaged around their mutually opposite side surfaces.

15. The filtration module of claim 1, wherein the filter unit further comprises at least one inlet and at least one outlet passing through at least one of the first and second plates and providing fluid communication with the at least one filter element.

* * * * *